United States Patent [19]
Motomura et al.

[11] Patent Number: 5,394,189
[45] Date of Patent: Feb. 28, 1995

[54] MOTION PICTURE CODER AND SYSTEM FOR CONTROLLING THE SAME

[75] Inventors: Masato Motomura; Tadayoshi Enomoto, both of Tokyo, Japan

[73] Assignee: NEC Corporation, Tokyo, Japan

[21] Appl. No.: 10,623

[22] Filed: Jan. 28, 1993

[30] Foreign Application Priority Data

Jan. 30, 1992 [JP] Japan .................................. 4-014401

[51] Int. Cl.⁶ ...................... H04N 7/133; H04N 7/137
[52] U.S. Cl. .................................. 348/402; 348/407
[58] Field of Search ............... 348/400, 401, 402–407, 348/699; H04N 7/133, 7/137; 364/725

[56] References Cited

U.S. PATENT DOCUMENTS 5,054,103 10/1991 Yasuda ............................ 358/261.2
5,057,918 10/1991 Denoyelle ........................... 348/402

*Primary Examiner*—Howard W. Britton
*Attorney, Agent, or Firm*—Young & Thompson

[57] ABSTRACT

A motion picture coder for coding plural macro blocks of motion picture data based on a standardizing system is disclosed. The coder comprises first and second pipelined processors executing different coding processes respectively, both of which are separated from one another so as to accomplish a parallel operation thereof. The first processor executes a motion vector detection for a second macro block, an inter-frame addition for a first macro block and an inter-frame difference for the first macro block. The second processor executes a discrete cosine transform for the first macro block, a quantization for the first macro block, an inverse quantization for the first macro block, an inverse discrete cosine transform for the first macro block and a loop filtering for the second macro block. The motion vector detection and the discrete cosine transform are concurrently processed and the inter-frame addition and the loop filtering are concurrently processed, thereby the processing times for each macro block are shortened and thus a high speed processing is realized.

5 Claims, 6 Drawing Sheets

FIG. 2 PRIOR ART

| PROCESSES FOR CODING | ARITHMETIC UNITS |
|---|---|
| MOTION VECTOR DETECTION | ARITHMETIC LOGIC UNIT<br>ACCUMULATOR<br>MAX/MIN VALUE DETECTOR |
| LOOP FILTERING | MULTIPLIER<br>ACCUMULATOR |
| INTER-FRAME DIFFERENCE | ARITHMETIC LOGIC UNIT |
| DCT | MULTIPLIER<br>ACCUMULATOR |
| QUANTIZATION | MULTIPLIER |
| INVERSE QUANTIZATION | MULTIPLIER<br>ACCUMULATOR |
| INVERSE DCT | MULTIPLIER<br>ACCUMULATOR |
| INTER-FRAME ADDITION | ARITHMETIC LOGIC UNIT |

FIG. 5

| PROCESSES FOR CODING | PROCESSOR | SIGNAL 107 | SIGNAL 108 | SIGNAL 109 |
|---|---|---|---|---|
| MOTION VECTOR DETECTION | FIRST | ABS | 161 | --- |
| LOOP FILTERING | SECOND | --- | --- | 191 |
| INTER-FRAME ADDITION | FIRST | SUB | 162 | --- |
| DCT | SECOND | --- | --- | 191 |
| QUANTIZATION | SECOND | --- | --- | 192 |
| INVERSE QUANTIZATION | SECOND | --- | --- | 191 |
| INVERSE DCT | SECOND | --- | --- | 191 |
| INTER-FRAME DIFFERENCE | FIRST | ADD | 162 | --- |

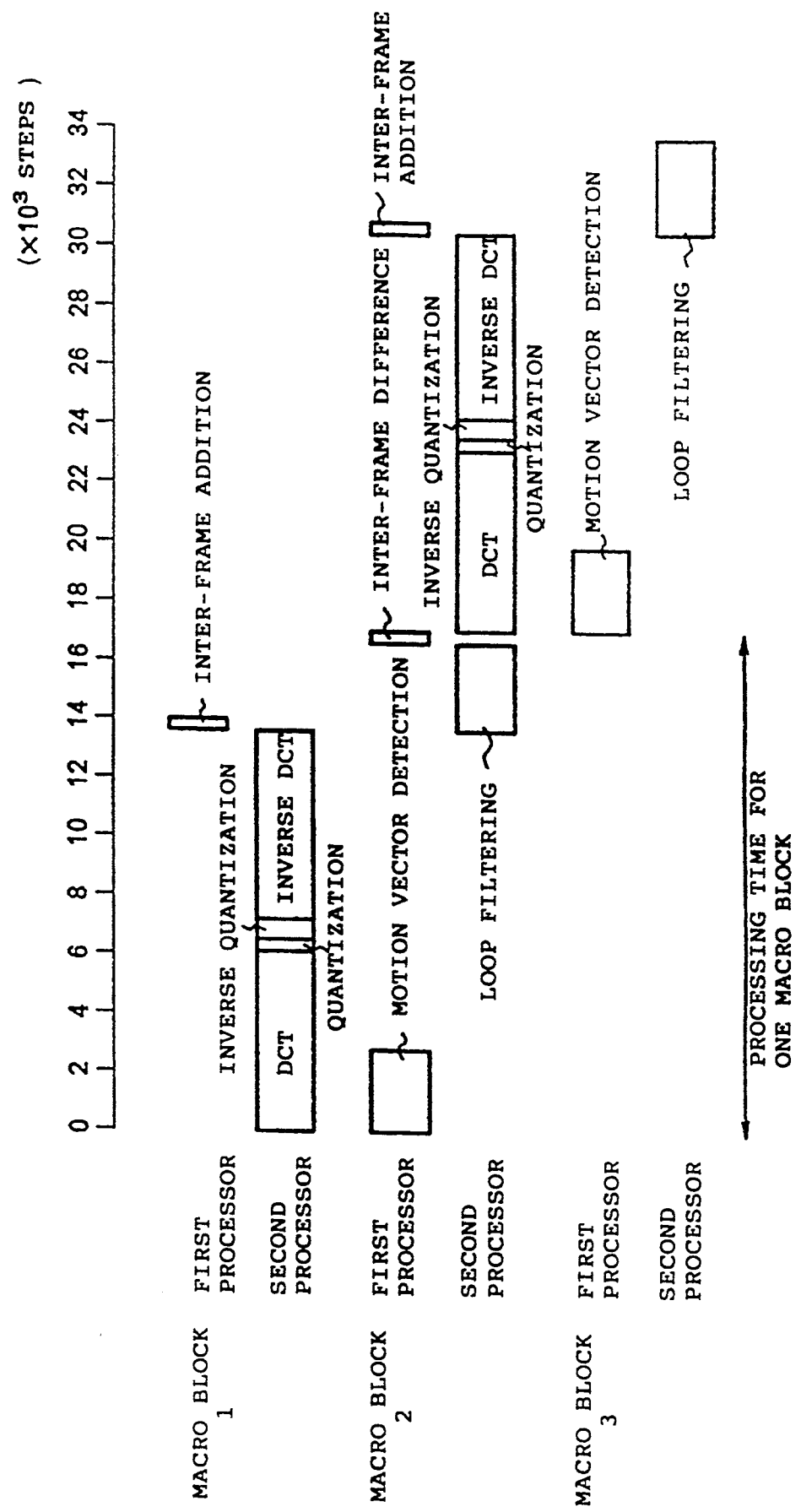

MOTION PICTURE CODER AND SYSTEM FOR CONTROLLING THE SAME

BACKGROUND OF THE INVENTION

The invention relates to a motion picture coder and a system for controlling the same, and more particularly to an architecture of a motion picture coder for coding motion picture data based on a predetermined standardizing system. A motion picture coding system being capable of compressing a great amount of the motion picture data is desired to realize video signal processing systems such as video tele-conferencing systems and video telephones. The coding of the motion picture should be implemented according to the standardizing system recommended as the CCITT recommendation H.261.

In such standardizing system, a single picture frame of motion picture data is divided into a plurality of macro blocks. Each of the macro blocks includes 256-pixel of luminance signals and 128-pixel of chrominance signals so as to serve as image data.

Further, the implementation of the standardizing system of the CCITT recommendation H.261 forces each of the macro blocks to be subjected to following eight processes. First, a motion vector detection for each of the divided macro blocks is implemented. Second, a loop filtering for the each divided macro block is implemented. Third and fourth processes are an inter-frame difference for the each divided macro block and a discrete cosine transform (DCT) of the each divided macro block respectively. A quantization for each divided macro block is accomplished as a fifth process, after which an inverse quantization for each divided macro block is accomplished as a sixth process. Subsequently, an inverse discrete cosine transform (inverse DCT) for the each divided macro block is accomplished as a seventh process. Finally, an inter-frame addition for each divided macro block is accomplished as an eighth process. Thus, the implementation of such standardizing system requires the above complicated processes.

Generally, for the motion picture coder, there exists a great quantity of motion picture data to be processed by a video signal processor. Thus, the implementation of the motion picture coding requires the motion picture coder to process an extensive amount of arithmetic to accomplish the coding operation based on the above standardizing system. It is important that the motion picture coder as a processor is able to operate a large amount of arithmetic within a predetermined time. It is required for the realization of the above matter to keep each part or each unit of the motion picture coder as a processor from taking on an idle state. If any part or any unit of the motion picture coder as a processor takes on an idle state, the motion picture coder is no longer able to sufficiently exhibit an excellent potential ability. In the sequential architectures, a major part of a processor tends to take on an idle state at each arithmetic step. One of architectures to improve processing speed of a single processor is the multi-stage pipe-lined architecture. The pipe-line system divides a great amount of arithmetic-into a plurality of small and independent arithmetic blocks so that a plurality of the divided arithmetic blocks are concurrently operated on at each stage of the pipe-lined processor. Such pipe-lined system is applicable to the above motion picture coding. An example of the conventional motion picture coders for coding the motion picture data according to the above standardizing system is disclosed in IEEE, Journal of Solid-State Circuits, Vol. 24, No. 6, December 1989, pp-1662–1667. The conventional motion picture coder utilizes the pipe-line system to improve the processing speed.

The structure of the conventional motion picture coder will be described with reference to FIG. 1. FIG. 1 omits arithmetic units such as a shifter which do not pertain to the above coding processes according to the above standardizing system. The structure of the conventional motion picture coder is so pipe-lined as to have three pipe-lined stages. Namely, the conventional motion picture coder comprises first, second and third pipe-lined stages. The conventional motion picture coder comprises a plurality of arithmetic units which accomplish the above eight processes for coding the motion picture data based upon the above standardizing system.

The first pipe-lined stage of the motion picture coder includes an arithmetic logic unit 410 and a multiplier 420. The arithmetic logic unit 410 is connected at its input side to data input terminals 401 and 402 respectively. Input data such as motion picture data are transmitted to the arithmetic logic unit 410 through an input data terminals 401 and 402. The arithmetic logic unit 410 executes the addition between two input data inputted through the data input terminals 401 and 402. The arithmetic logic unit 410 also executes a subtraction between the two input data inputted through the data input terminals 401 and 402. The arithmetic logic unit 410 also executes an absolute value subtraction and a variety of logical operations of the two input data. The arithmetic logic unit 410 is connected at its output side to the input side of a selector 460. The result of the logic arithmetic provided by the arithmetic logic unit 410 is transmitted to the selector 460.

The multiplier 420 is connected at its input side, in parallel to the arithmetic logic unit 410, to the data input terminals 401 and 402 through selectors 450-1 and 450-2. The selectors 450-1 and 450-2 are connected at those input sides to the data input terminals 401 and 402 respectively. Each of the selectors 450-1 and 450-2 is also connected at its input side to the output side of the arithmetic logic unit 410. The selectors 450-1 and 450-2 are further connected at its output side to the input side of the multiplier 420. The multiplier 420 is connected at its output side to the input side of the selector 460. Input data such as the motion picture data are also transmitted from the input data terminals 401 and 402 to each of the selectors 450-1 and 450-2 respectively. The result of the logic arithmetic of the input data by the arithmetic logic unit 410 is also transmitted to each of the selectors 450-1 and 450-2. The selector 450-1 selects either the input data transmitted from the data input terminal 401 or the result of the arithmetic of the input data transmitted from the arithmetic logic unit 410. The selector 450-1 transmits the selected data to the multiplier 420. Similarly, the selector 450-2 selects either the input data transmitted from the data input terminal 402 or the result of the arithmetic of the input data transmitted from the arithmetic logic unit 410. The selector 450-2 transmits the selected data to the multiplier 420. The multiplier 420 executes the multiplication between the selected data transmitted from the selectors 450-1 and 450-2 respectively. The multiplier 420 transmits the result of the multiplication of the data to the selector 460. The selector 460 selects either the result of the logic arithmetic of the data transmitted from the arithmetic logic unit 410 or the result of the multiplication of the data transmitted from the multiplier 420.

The second pipe-lined stage of the motion picture coder includes an accumulator 430. The third pipe-lined stage of the motion picture coder includes a maximum and minimum value detector 440. The accumulator 430 existing on the second pipe-lined stage is connected at its input side to the output side of the selector 460. The accumulator 430 is connected at its output side to the input side of the maximum and minimum value detector 440 existing on the third pipe-lined stage of the motion picture coder. The output side of the accumulator 430 is further connected to the input side thereof, and thus both the input and output sides of the accumulator 430 are looped. The accumulator 430 is further connected at its output side to the input side of a selector 470. The selector 460 is also connected at its output side to the input side of the selector 470. The selector 460 transmits the selected data to the accumulator 430, and thus either the result of the logic arithmetic provided by the arithmetic logic unit 410 or the result of the multiplication provided by the multiplier 420 is selected by the selector 460 and transmitted to the accumulator 430. The previous result of the accumulation provided by the accumulator 430 is transmitted from the output side of the accumulator 430 to the input side of the accumulator 430. The accumulator 430 executes the accumulation of the selected data transmitted from the selector 460 and the previous result of the accumulation provided by the accumulator 430. The accumulator 430 transmits the result of the accumulation to the maximum and minimum value detector 440 existing on the third pipe-lined stage of the motion picture coder.

The maximum and minimum value detector 440 detects what has maximum and minimum values from the results of the accumulation transmitted from the accumulator 430. The maximum and minimum value detector 440 outputs the result of the detection for the maximum and minimum values and then transmits it to the selector 470.

The selector 470 fetches the result of the selection by the selector 460, and thus either the result of the logic arithmetic provided by the arithmetic logic unit 410 or the result of the multiplication provided by the multiplier 420. The selector 470 also fetches the result of the accumulation of the data from the accumulator 430. The selector 470 also fetches the result of the detection for the maximum and minimum values of the data from the maximum and minimum value detector 440. The selector 470 selects any one of the above fetched data. The selector 470 is further connected at its output side to an arithmetic result output terminal 403. The selector 470 transmits the selected data to the arithmetic result output terminal 403. Thus, any one of the fetched data by the selector 470 is outputted as the arithmetic result of the motion picture coder through the arithmetic result output terminal 403. Namely, the arithmetic result of the motion picture coder falls into any one of the three results, for instance, the result of the maximum and minimum values detection provided by the maximum and minimum value detector 440, the result of the accumulation provided by the accumulator 430 and either the result of the logic arithmetic provided by the arithmetic logic unit 410 or the result of the multiplication provided by the multiplier 420.

The operation of the conventional motion picture coder will subsequently be described in detail with reference to FIGS. 2 and 3. FIG. 2 indicates each of the processes of the motion picture coding based on the above predetermined standardizing system. FIG. 2 also indicates the arithmetic units to be used on the each process of the motion picture coding based on the above predetermined standardizing system.

As described above, the motion picture coding according to the above predetermined standardizing system requires the following eight processes. Namely, the first process is the motion vector detection. Second process is the loop filtering. Third process is the inter-frame difference. Fourth process is the discrete cosine transform (DCT). Fifth process is the quantization. Sixth process is the inverse quantization. Seventh process is the inverse discrete cosine transform (inverse DCT). Final process is the inter-frame addition.

Subsequently, the above processes of the motion picture coding based on the predetermined standardizing system will be described in detail with reference to FIGS. 1 and 2. The motion vector detection as a first process of the motion picture coding is performed by the following steps. Image data are inputted through the data input terminals 401 and 402 into the arithmetic logic unit 410 existing on the first pipe-lined stage. The arithmetic logic unit 410 executes the absolute value subtraction between the image data inputted from the data input terminals 401 and 402 respectively. After that, the arithmetic logic unit 410 transmits the result of the absolute value subtraction between the input image data to the selector 460. The selector 460 selects the result of the absolute value subtraction between the input image data. Then, the selector 460 transmits the result of the absolute value subtraction to the accumulator 430 existing on the second pipe-lined stage. The accumulator 430 accumulates the result of the absolute value subtraction on the previous result of the accumulation executed by itself. The accumulator 430 subsequently transmits the result of the accumulation to the maximum and minimum value detector 440 which exists on the third pipe-lined stage. The maximum and minimum value detector 440 fetches the result of the accumulation provided by the accumulator 430 and executes the minimum value detection, and thus detects what has a minimum value from the fetched result of the accumulation. The maximum and minimum value detector 440 transmits the result of the maximum and minimum value detection to the selector 470. The selector 470 selects the result of the maximum and minimum value detection transmitted from the maximum and minimum value detector 440, and then transmits the result of the maximum and minimum value detection to the arithmetic result output terminal 403. Namely, the result of the maximum and minimum value detection is outputted through the arithmetic result output terminal 403 as an arithmetic result of the process of the motion vector detection. Therefore, the accomplishment of the motion vector detection process requires the above three units to be operated, and thus the operations of the arithmetic logic unit 410, the accumulator 430 and the maximum and minimum value detector 440.

The loop filtering as a second process of the motion picture coding is performed by the following steps. Image data is transmitted through the data input terminal 401' to the selector 450-1. Filter coefficient data is transmitted through the data input terminal 402 to the selector 450-2. The selector 450-1 selects the image data inputted through the data input terminal 401. The selector 450-1 transmits the image data to the multiplier 420 which exists on the first pipe-lined stage. The selector 450-2 also selects the filter coefficient data transmitted through the data input terminal 402. The selector 450-2 transmits the filter coefficient data to the multiplier 420. The multiplier 420 executes the multiplication of the image data and the filter coefficient data. The multiplier 420 transmits the result of the multiplication of the image data and the filter coefficient data to the selector 460. The selector 460 selects the result of the multiplication of the image data and the filter coefficient data and transmits it to the accumulator 430 which exists on the second pipe-lined stage. The accumulator 430 accumulates the result of the multiplication of the image data and the filter coefficient data on the previous result of the accumulation executed by itself. The accumulator 430 transmits the result of the accumulation to the selector 470. The selector 470 selects the result of the accumulation executed by the accumulator 30 and transmits it to the arithmetic result output terminal 403. Namely, the result of the accumulation is outputted through the arithmetic result output terminal 403 as an arithmetic result of the process of the loop filtering, thereby permitting the digital filtering to be realized. Therefore, the accomplishment of the loop filtering process requires the above two units to be operated, and thus the operations of the multiplier 420 and the accumulator 430.

The inter-frame difference as a third process of the motion picture coding is performed by the following steps. Image data are inputted through the data input terminals 401 and 402 to the arithmetic logic unit 410 existing on the first pipe-lined stage. The arithmetic logic unit 410 executes the subtraction between the image data, both of which are transmitted through the data input terminals 401 and 402. The arithmetic logic unit 410 transmits the result of the subtraction between the image data to the selector 460. The selector 460 selects the result of the subtraction between the image data provided by the arithmetic logic unit 410 and transmits it to the selector 470. The selector 470 selects the result of the subtraction executed by the arithmetic logic unit 410 and transmits it to the arithmetic result output terminal 403. Namely, the result of the subtraction is outputted through the arithmetic result output terminal 403 as an arithmetic result of the process of the inter-frame difference. Therefore, the accomplishment of the inter-frame difference process requires the above single unit to be operated, and thus the subtraction operation of the arithmetic logic unit 410.

The discrete cosine transform (DCT) as a fourth process of the motion picture coding is performed by the following steps. Image data is transmitted through the data input terminal 401 to the selector 450-1. Discrete cosine transform coefficient (DCT coefficient) data is transmitted through the data input terminal 402 to the selector 450-2. The selector 450-1 selects the image data inputted through the data input terminal 401. The selector 450-1 transmits the image data to the multiplier 420 which exists on the first pipe-lined stage. The selector 450-2 also selects the discrete cosine transform coefficient (DCT coefficient) data transmitted through the data input terminal 402. The selector 450-2 transmits the discrete cosine transform coefficient (DCT coefficient) data to the multiplier 420. The multiplier 420 executes the multiplication of the image data and the discrete cosine transform (DCT coefficient) data. The multiplier 420 transmits the result of the multiplication of the image data and the discrete cosine transform coefficient (DCT coefficient) data to the selector 460. The selector 460 selects the result of the multiplication of the image data and the discrete cosine transform coefficient (DCT coefficient) data and transmits it to the accumulator 430 which exists on the second, pipe-lined stage. The accumulator 430 accumulates the result of the multiplication of the image data and the discrete cosine transform coefficient (DCT coefficient) data on the previous result of the accumulation executed by itself. The accumulator 430 transmits the result of the accumulation to the selector 470. The selector 470 selects the result of the accumulation executed by the accumulator 430 and transmits it to the arithmetic result output terminal 403. Namely, the result of the accumulation is outputted through the arithmetic result output terminal 403 as an arithmetic result of the process of the discrete cosine transform. Therefore, the accomplishment of the discrete cosine transform process requires the above two units to be operated, and thus the operations of the multiplier 420 and the accumulator 430.

The quantization as a fifth process of the motion picture coding is performed by the following steps. The arithmetic result of the discrete cosine transform (DCT) process is inputted through the data input terminal 401 to the selector 450-1. The selector 450-1 selects the arithmetic result of the discrete cosine transform (DCT) process and transmits it to the multiplier 420 existing on the first pipe-lined stage. The reciprocal of the quantization coefficient is inputted through the data input terminal 402 to the selector 450-2. The selector 450-2 selects the reciprocal of the quantization coefficient and transmits it to the multiplier 420. The multiplier 420 executes the multiplication between the arithmetic result of the discrete cosine transform (DCT) and the reciprocal of the quantization coefficient, both of which are transmitted through the data input terminals 401 and 402 respectively. The multiplier 420 transmits the result of the multiplication between the arithmetic result of the discrete cosine transform (DCT) and the reciprocal of the quantization coefficient to the selector 460. The selector 460 selects the result of the multiplication between the arithmetic result of the discrete cosine transform (DCT) and the reciprocal of the quantization coefficient, and then transmits it to the selector 470. The selector 470 selects the result of the multiplication executed by the multiplier 420 and transmits it to the arithmetic result output terminal 403. Namely, the result of the multiplication is outputted through the arithmetic result output terminal 403 as an arithmetic result of the process of the quantization. Therefore, the accomplishment of the quantization process requires the above single unit to be operated, and thus the multiplication operation of the multiplier 420.

The inverse quantization as a sixth process of the motion picture coding is performed by the following steps. The arithmetic result of the quantization process is transmitted through the data input terminal 401 to the selector 450-1. Quantization coefficient data is transmitted through the data input terminal 402 to the selector 450-2. The selector 450-1 selects the arithmetic result of the quantization inputted through the data input terminal 401. The selector 450-1 transmits the arithmetic result of the quantization to the multiplier 420 which exists on the first pipe-lined stage. The selector 450-2 also selects the quantization coefficient data transmitted through the data input terminal 402. The selector 450-2 transmits the quantization coefficient data to the multiplier 420. The multiplier 420 executes the multiplication of the arithmetic result of the quantization and the quantization coefficient data. The multiplier 420 transmits the result of the multiplication of the arithmetic result of the quantization and the quantization coefficient data to the selector 460. The selector 460 selects the result of the multiplication of the arithmetic result of the quantization and the quantization coefficient data and transmits it to the accumulator 430 which exists on the second pipe-lined stage. The accumulator 430 accumulates the result of the multiplication of the arithmetic result of the quantization and the quantization coefficient data on the previous result of the accumulation executed by itself. The accumulator 430 transmits the result of the accumulation to the selector 470. The selector 470 selects the result of the accumulation executed by the accumulator 430 and transmits it to the arithmetic result output terminal 403. Namely, the result of the accumulation is outputted through the arithmetic result output terminal 403 as an arithmetic result of the process of the inverse quantization. Therefore, the accomplishment of the inverse quantization process requires the above two units to be operated, and thus the operations of the multiplier 420 and the accumulator 430.

The inverse discrete cosine transform (inverse DCT) as a seventh process of the motion picture coding is performed by the following steps. The arithmetic result of the inverse quantization process is transmitted through the data input terminal 401 to the selector 450-1. Inverse discrete cosine transform (inverse DCT) coefficient data is transmitted through the data input terminal 402 to the selector 450-2. The selector 450-1 selects the arithmetic result of the inverse quantization inputted through the data input terminal 401. The selector 450-1 transmits the arithmetic result of the inverse quantization to the multiplier 420 which exists on the first pipe-lined stage. The selector 450-2 also selects the inverse discrete cosine transform (inverse DCT) coefficient data transmitted through the data input terminal 402. The selector 450-2 transmits the inverse discrete cosine transform (inverse DCT) coefficient data to the multiplier 420. The multiplier 420 executes the multiplication of the arithmetic result of the inverse quantization and the inverse discrete cosine transform (inverse DCT) coefficient data. The multiplier 420 transmits the result of the multiplication of the arithmetic result of the inverse quantization and the inverse discrete cosine transform (inverse DCT) coefficient data to the selector 460. The selector 460 selects the result of the multiplication of the arithmetic result of the inverse quantization and the inverse discrete cosine transform (inverse DCT) coefficient data and transmits it to the accumulator 430 which exists on the second pipe-lined stage. The accumulator 430 accumulates the result of the multiplication of the arithmetic result of the inverse quantization and the inverse discrete cosine transform (inverse DCT) coefficient data on the previous result of the accumulation executed by itself. The accumulator 430 transmits the result of the accumulation to the selector 470. The selector 470 selects the result of the accumulation executed by the accumulator 430 and transmits it to the arithmetic result output terminal 403. Namely, the result of the accumulation is outputted through the arithmetic result output terminal 403 as an arithmetic result of the process of the inverse discrete cosine transform (inverse DCT). Therefore, the accomplishment of the inverse discrete cosine transform (inverse DCT) process requires the above two units to be operated, and thus the operations of the multiplier 420 and the accumulator 430. The inter-frame addition as a final process of the motion picture coding is performed by the following steps. The arithmetic result of the inverse discrete cosine transform (inverse DCT) process is inputted through the data input terminal 401 to the arithmetic logic unit 410 existing on the first pipe-lined stage. Image data is inputted through the data input terminal 402 to the arithmetic logic unit 410. The arithmetic logic unit 410 executes the addition between the image data and the arithmetic result of the inverse discrete cosine transform (inverse DCT), both of which are transmitted through the data input terminals 402 and 401 respectively. The arithmetic logic unit 410 transmits the result of the addition between the image data and the arithmetic result of the inverse discrete cosine transform (inverse DCT) to the selector 460. The selector 460 selects the result of the addition provided by the arithmetic logic unit 410 and transmits it to the selector 470. The selector 470 selects the result of the addition executed by the arithmetic logic unit 410 and transmits it to the arithmetic result output terminal 403. Namely, the result of the addition is outputted through the arithmetic result output terminal 403 as an arithmetic result of the process of the inter-frame addition. Therefore, the accomplishment of the inter-frame addition process requires the above single unit to be operated, and thus the addition operation of the arithmetic logic unit 410.

FIG. 3 is a timing chart which indicates the sequence of the above motion picture coding processes and the number of steps required to accomplish each of the above processes for each macro block. A step means a performance time of one pipe-lined stage of the motion picture coder. The number of steps of each motion picture coding process for a single macro block will be described. The motion vector detection as a first motion picture coding process requires 2880 steps. The loop filtering as a second motion picture coding process requires 3114 steps. The inter-frame difference as a third motion picture coding process requires 384 steps. The discrete cosine transform (DCT) as a fourth motion picture coding process requires 6144 steps. The quantization as a fifth motion picture coding process requires 384 steps. The inverse quentization as a sixth motion picture coding process requires 786 steps. The inverse discrete cosine transform (inverse DCT) as a seventh motion picture coding process requires 6144 steps. The inter-frame addition as a final motion picture coding process requires 384 steps. The inverse quentization as a sixth motion picture coding process requires 786 steps. The above eight processes for the motion picture coding are sequentially performed. Thus, the number of the total steps of the above motion picture coding processes for one macro block is 20220 steps.

The conventional architecture of the motion picture coder based upon the standardizing system will be investigated. In the prior art, the above processes of the motion picture coding for a single macro block are sequentially repeated until motion picture coding processes for all macro blocks are finished. Namely, each macro block is sequentially processed by the motion picture coder.

The conventional motion picture coder involves, on its first pipe-lined stage, the arithmetic logic unit 410 and the multiplier 420, both of which are connected, in parallel to one another, to the second pipe-lined stage of the motion picture coder. The selector 460 selects either the operation of the arithmetic logic unit 410 or the operation of the multiplier 420. This means that at least one of the arithmetic logic unit 410 and the multiplier 420 takes an idle state on each the motion picture coding process. As described above, when there exists an idle state of a part of the arithmetic units involved in the motion picture coder, the motion picture coder is unable to exhibit its maximum potential ability at the processing speed of the motion picture coding process. Although the motion picture coder utilizes the pipe-line system to improve processing speed, the motion picture coder suppresses the advantage in a high speed processing possessed by the pipe-line system to be sufficiently exhibited.

Such considerable disadvantage in suppressing the processing speed to be improved is caused by its architecture. The conventional architecture arranges a plurality of arithmetic units, for example, the arithmetic logic unit 410 and the multiplier 420 on a single pipe-lined stage, and thus the first pipe-lined stage. Thus, it is impossible that the arithmetic logic unit 410 and the multiplier 420 are concurrently operated. Such architecture forces at least any one of the arithmetic logic unit 410 or the multiplier 420 to always take on an idle state. This suppresses the advantage in a high speed processing possessed by the pile-line system to be exhibited.

To combat such problem, it is required to provide a novel architecture of a pipe-lined motion picture coder which is able to perform each of the motion picture coding processes without idling of arithmetic units involved in the motion picture coder. Thus, it is desirable to provide a novel architecture of a pipe-lined motion picture coder which permits improving its processing speed of the motion picture coding for all of plural macro blocks, and thus permits pipe-lined arithmetic units to exhibit those maximum potential ability at the processing speed of the motion picture coding for plural macro blocks.

SUMMARY OF THE INVENTION

Accordingly, it is a primary object of the present invention to provide a novel motion picture coder having a plurality of pipe-lined stages for coding motion picture data based upon a predetermined standardizing system.

It is a further object of the present invention to provide a novel motion picture coder having a plurality of pipe-lined stages which enable a high speed processing of the motion picture coding for plural macro blocks to be exhibited.

It is a still further object of the present invention to provide a novel motion picture coder having a plurality of pipe-lined stages able to perform the motion picture coding processes for plural macro blocks without idling arithmetic units involved in the motion picture coder.

The above and other objects, features and advantages of the present invention will be apparent from the following descriptions.

The present invention provides a novel motion picture coder having multi-pipe-lined stages for coding a plurality of macro blocks of motion picture data based upon a predetermined standardizing system. The motion picture coder essentially comprises a first pipe-lined processor and a second pipe-lined processor, both of which are separated from one another so as to realize the parallel operation thereof. The first and second pipe-lined processors concurrently execute different motion picture coding processes for different macro blocks respectively. The first pipe-lined processor executes a motion vector detection process for a second macro block, an inter-frame addition process for a first macro block and an inter-frame difference process for the second macro block. In contrast, the second pipe-lined processor executes a discrete cosine transform process for the first macro block, a quantization process for the first macro block, an inverse quantization process for the first macro process, an inverse discrete cosine transform process for the first macro process and a loop filtering process for the second macro block.

The first and second processors concurrently execute the motion vector detection process for the second macro block and the discrete cosine transform process for the first macro block respectively, thereby realizing the parallel operation of the first and second pipe-lined processors. Further, the first and second pipe-lined processors concurrently execute the inter-frame addition process for the first macro block and the loop filtering process for the second macro block respectively, thereby realizing the parallel operation of the first and second pipe-lined processors.

The first pipe-lined processor further comprises a first pipe-lined stage including an adder, a second pipe-lined stage including an accumulator and a third pipe-lined stage including a minimum value detector. The second pipe-lined processor further comprises a first pipe-lined stage including a multiplier and a second pipe-lined stage including an accumulator.

BRIEF DESCRIPTION OF THE DRAWINGS

Preferred embodiments of the present invention will hereinafter fully be described in detail with reference to the accompanying drawings.

FIG. 2 is a view illustrative of arithmetic units involved in the conventional motion picture coder, which are required to perform each process of the motion picture coding.

FIG. 5 is a view illustrative of arithmetic units involved in a novel motion picture coder, which are required to perform each process of the motion picture coding.

FIG. 6 is a timing chart of each process of the motion picture coding executed by a novel motion picture coder.

PREFERRED EMBODIMENTS OF THE INVENTION

The present invention provides a novel architecture of a motion picture coder for coding motion picture data based upon a predetermined standardizing system, for instance, the CCITT recommendation H.261. The novel motion picture coder comprises a first processor and a second processor, both of which are operated in parallel to one another, and thus concurrently perform different motion picture coding processes individually. The first processor performs the motion vector detection, the inter-frame difference and the inter-frame addition. The second processor performs the discrete cosine transform (DCT), the quantization, the inverse quantization and the inverse discrete cosine transform (inverse DCT).

Figure 1:
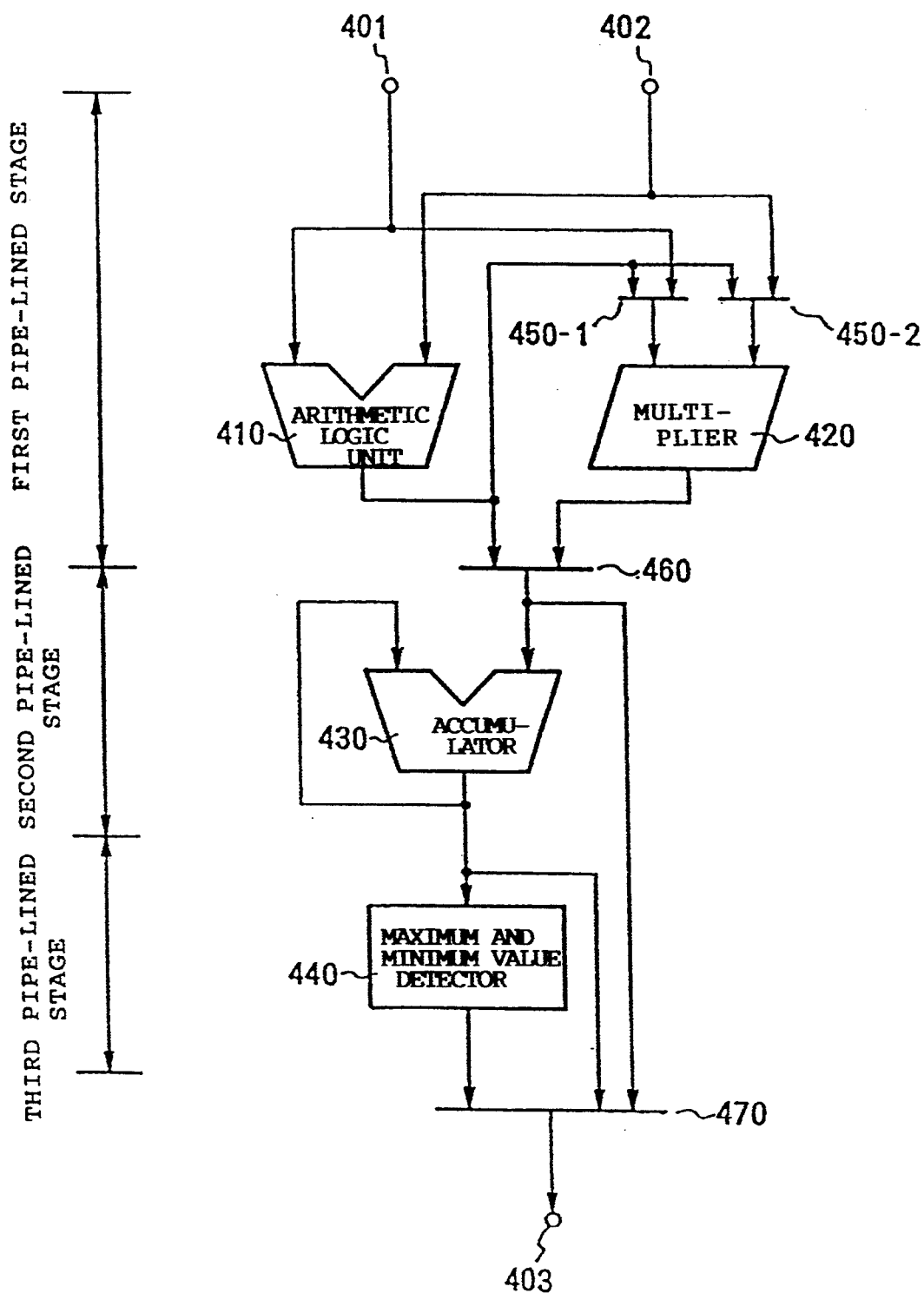
FIG. 1 is a circuit diagram illustrative of a circuit structure of the conventional motion picture coder having three pipe-lined stages.
Figure 3:
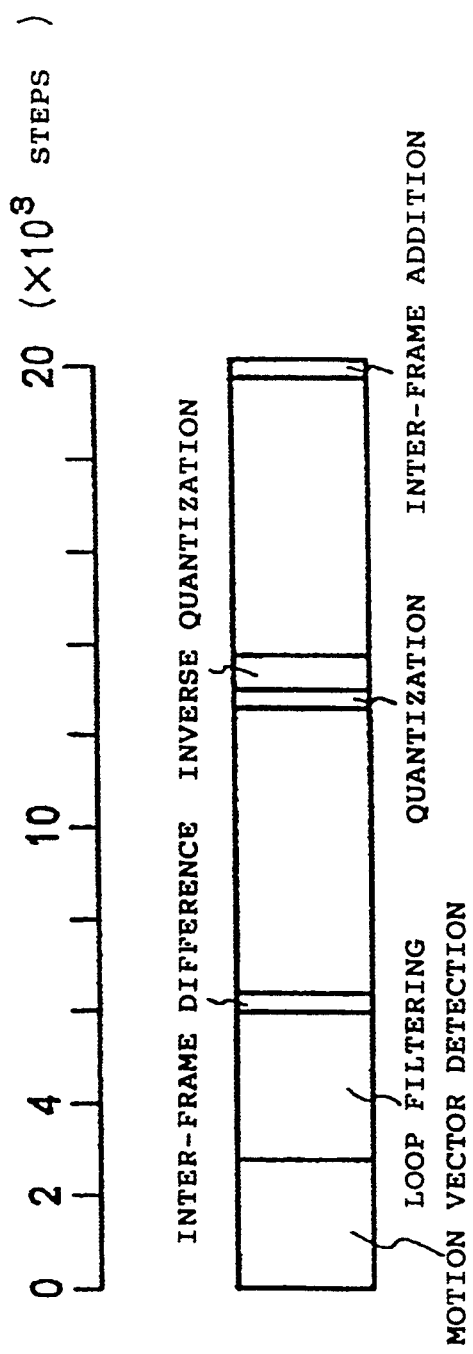
FIG. 3 is a timing chart of each process of the motion picture coding executed by the conventional motion picture coder.
Figure 4:
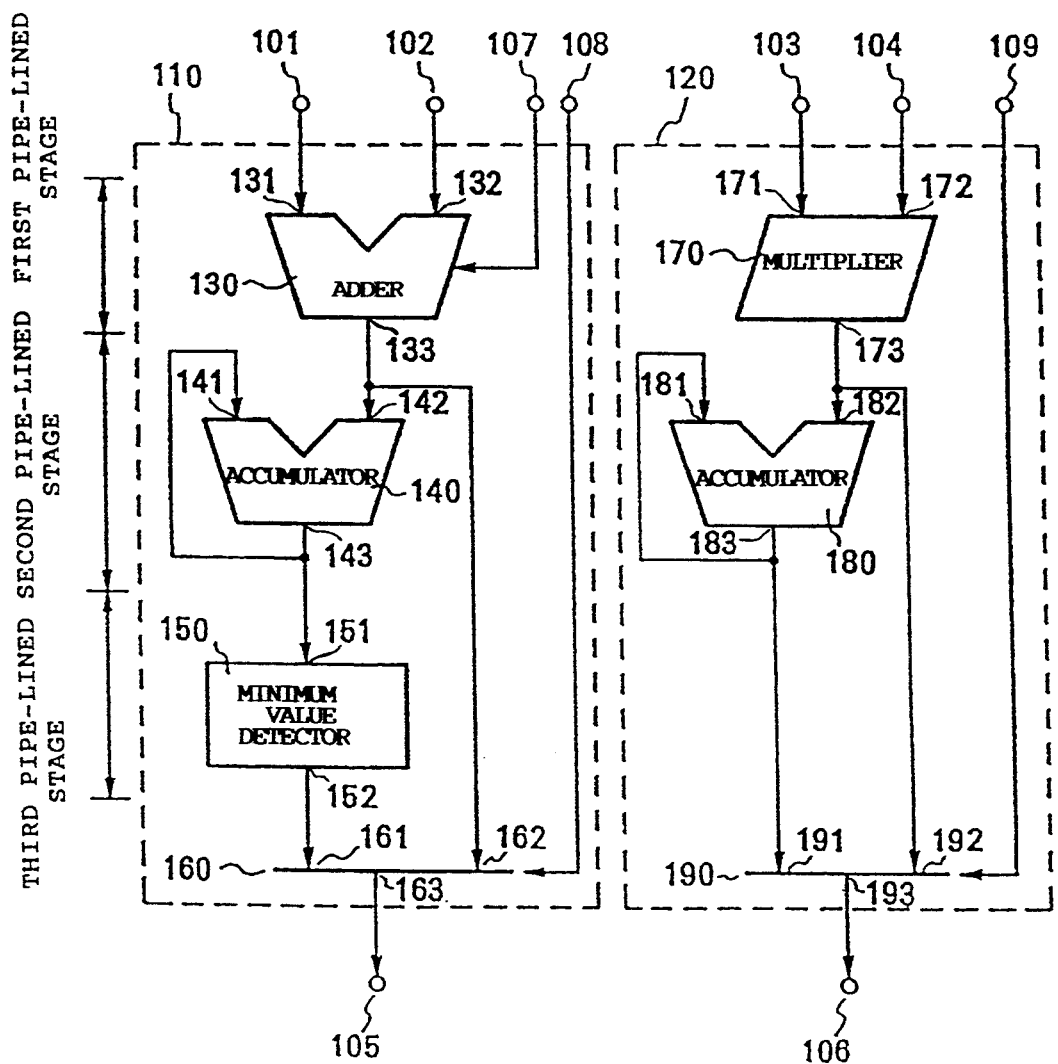
FIG. 4 is a circuit diagram illustrative of a circuit structure of a novel motion picture coder having three pipe-lined stages.

The structure of a novel motion picture coder will be described with reference to FIG. 4. FIG. 4 omits arithmetic units such as a shifter which do not pertain to the above coding processes according to the above standardizing system. The novel motion picture coder comprises two individual processors, and thus a first processor 110 and a second processor 120 which are completely separated from one another. The first processor 110 of the the novel motion picture coder is so pipe-lined as to have three pipe-lined stages. Similarly, the second processor 120 of the the novel motion picture coder is also so pipe-lined as to have two pipe-lined stages. Namely, the first and second processors of the novel motion picture coder comprise three and two pipe-lined stages respectively. Each of the first and second processors of the novel motion picture coder includes a plurality of arithmetic units which execute the motion picture coding processes based upon the above standardizing system.

The circuit structure of the first processor 110 of the motion picture coder will be described with reference to FIG. 4.

The first pipe-lined stage of the first processor 110 of the motion picture coder includes a single arithmetic adder 130. The second pipe-lined stage of the first processor 110 of the motion picture coder also includes a single arithmetic accumulator 140. The third pipe-lined stage of the first processor 110 of the motion picture coder also includes a single arithmetic unit, and thus a minimum value detector 150.

The adder 130 is connected at its input terminals 131 and 132 to data input terminals 101 and 102 of the first processor 110 respectively. The adder 130 is further connected to a control signal input terminal 107 so that the adder 130 is operated according to control signals supplied through the control signal input terminal 107. Input data such as motion picture data are transmitted to the adder 130 through the input data terminals 101 and 102. The adder 130 executes the addition between two input data inputted through the data input terminals 101 and 102. The adder 130 also executes the subtraction between the two input data inputted through the data input terminals 101 and 102. The adder 130 also executes the absolute value subtraction of the two input data. The adder 130 is connected at its output terminal 133 to an input terminal 142 of the accumulator 140 existing on the second pipe-lined stage of the first processor 110 of the motion picture coder. The result of the absolute value subtraction provided by the adder 130 is transmitted to the accumulator 140.

The accumulator 140 is connected at its output terminal 143 to an input terminal 151 of the minimum value detector 150 existing on the third pipe-lined stage of the first processor 110 of the motion picture coder. The output terminal 143 of the accumulator 140 is further connected to an input terminal 141 thereof, and thus both the input and output terminals 141 and 143 of the accumulator 140 are looped. The previous result of the accumulation provided by the accumulator 140 is transmitted from the output terminal 143 of the accumulator 140 to the input terminal 141 of the accumulator 140. The accumulator 140 executes the accumulation of the result of the absolute value subtraction provided by the adder 130 and the previous result of the accumulation provided by the accumulator 140. The accumulator 140 transmits the result of the accumulation to the minimum value detector 150 existing on the third pipe-lined stage of the first processor 110 of the motion picture coder. The minimum value detector 150 is connected at its output terminal 152 to an input terminal 161 of a selector 160. The minimum value detector 150 detects minimum values from the results of the accumulation by comparing between the results of the accumulation sequentially transmitted from the accumulator 140. The minimum value detector 150 outputs what the accumulation result having the detected minimum value is numbered by as a result of the detection of the minimum values and then transmits it to the selector 160.

The selector 160 is connected to a control signal input terminal 108 so that the selector 160 is operated according to control signals transmitted through the control signal input terminal 108. The selector 160 is connected at its input terminal 162 to the output terminal 133 of the adder 130. The selector 160 fetches the result of the logic arithmetic provided by the adder 130 and the result of the detection of the minimum value provided by the minimum value detector 150. The selector 160 selects any one of the above fetched data, and thus selects any one of the result of the minimum value detection and the result of the logic arithmetic. The selector 160 is further connected at its output terminal 163 to an arithmetic result output terminal 105. The selector 160 transmits the selected data to the arithmetic result output terminal 105. Thus, any one of the fetched data by the selector 160 is outputted as the arithmetic result of the first processor 110 of the motion picture coder through the arithmetic result output terminal 105. Namely, the arithmetic result of the first processor 110 of the motion picture coder falls into any one of the two results, for instance, either minimum values provided by the minimum value detector 150 or the result of the logic arithmetic provided by the adder 130.

The circuit structure of the second processor 120 of the motion picture coder will be described with reference to FIG. 4.

The first pipe-lined stage of the second processor 120 of the motion picture coder includes a single arithmetic multiplier 170. The second pipe-lined stage of the second processor 120 of the motion picture coder also includes a single arithmetic accumulator 180.

The multiplier 170 is connected at its input terminals 171 and 172 to data input terminals 103 and 104 respectively. Input data such as the arithmetic results are transmitted to the multiplier 170 through the input data terminals 103 and 104. The multiplier 170 executes the multiplication between two input data inputted through the data input terminals 103 and 104. The multiplier 170 is connected at its output terminal 173 to an input terminal 182 of the accumulator 180 existing on the second pipe-lined stage of the second processor 120 of the motion picture coder. The result of the multiplication provided by the multiplier 170 is transmitted to the accumulator 180.

The accumulator 180 is connected at its output terminal 183 to an input terminal 191 of a selector 190 of the second processor 120. The output terminal 183 of the accumulator 180 is further connected to an input terminal 181 thereof, and thus both the input and output terminals 181 and 183 of the accumulator 180 are looped. A predetermined constant value stored in the accumulator 180 is transmitted from the output terminal 183 of the accumulator 180 to the input terminal 181 of the accumulator 180. The previous result of the accumulation provided by the accumulator 180 is transmitted from the output terminal 183 of the accumulator 180 to the input terminal 181 of the accumulator 180. The accumulator 180 executes the addition of the result of the multiplication provided by the multiplier 170 on the predetermined constant value stored in the accumulator 180. The accumulator 180 also executes the accumulation of the result of the multiplication provided by the multiplier 170 on the previous result of the accumulation provided by the accumulator 180. The accumulator 180 transmits the result of the accumulation or the addition to the selector 190.

The selector 190 is connected to a control signal input terminal 109 so that the selector 190 is operated according to control signals transmitted through the control signal input terminal 109. The selector 190 is connected at its input terminal 192 to the output terminal 173 of the multiplier 170. The selector 190 fetches the result of the multiplication provided by the multiplier 170 and the result of the accumulation provided by the accumulator 180. The selector 190 selects any one of the above fetched data, and thus selects any one of the result of the accumulation and the result of the multiplication. The selector 190 is further connected at its output terminal 193 to an arithmetic result output terminal 106. The selector 190 transmits the selected data to the arithmetic result output terminal 106. Thus, any one of the fetched data by the selector 190 is outputted as the arithmetic result of the second processor 120 of the motion picture coder through the arithmetic result output terminal 106. Namely, the arithmetic result of the second processor 120 of the motion picture coder falls into any one of the two results, for instance, the result of the accumulation provided by the accumulator 180 and the result of the multiplication provided by the multiplier 170. The operation of the novel motion picture coder will subsequently be described in detail with reference to FIGS. 5 and 6. FIG. 5 indicates each of the processes of the motion picture coding based on the above predetermined standardizing system. FIG. 5 also indicates the first or second processor to be used on each process of the motion picture coding for each macro block based on the above predetermined standardizing system. As described above, the motion picture coding according to the above predetermined standardizing system requires the following eight processes. Namely, the first process is the motion vector detection. Second process is the loop filtering. Third process is the inter-frame difference. Fourth process is the discrete cosine transform (DCT). Fifth process is the quantization. Sixth process is the inverse quantization. Seventh process is the inverse discrete cosine transform (inverse DCT). Final process is the inter-frame addition.

Subsequently, the above processes of the motion picture coding based on the predetermined standardizing system will be described in detail with reference to FIGS. 4 and 5.

The motion vector detection as a first process of the motion picture coding is performed by the first processor 110 of the motion picture coder. Image data are inputted through the data input terminals 101 and 102 into the adder 130 existing on the first pipe-lined stage of the first processor 110. The adder 130 executes the absolute value subtraction between the image data inputted from the-data input terminals 101 and 102 respectively. After that, the adder 130 transmits the result of the absolute value subtraction between the input image data to the accumulator 140 existing on the second pipe-lined stage of the first processor 110. The accumulator 140 accumulates the result of the absolute value subtraction on the previous result of the accumulation executed by itself. The accumulator 140 subsequently transmits the result of the accumulation to the minimum value detector 150 which exists on the third pipe-lined stage of the first processor 110. The minimum value detector 150 fetches the result of the accumulation provided by the accumulator 140 and executes the minimum value detection of the serial number of the minimum value, and thus detects what an accumulation result having a minimum value is numbered by from the fetched results of the accumulation. The minimum value detector 150 transmits a serial number of the minimum value as a result of the minimum value detection to the selector 160. The selector 160 selects the result of the minimum value detection transmitted from the minimum value detector 150, and then transmits the result of the minimum value detection to the arithmetic result output terminal 105 according to the control signals supplied through the control signal input terminal 108. Namely, the result of the minimum value detection, and thus the detected minimum value is outputted through the arithmetic result output terminal 105 as an arithmetic result of the process of the motion vector detection. Therefore, the accomplishment of the motion vector detection process requires the first processor 110, for example, the adder 130, the accumulator 140 and the minimum value detector 150.

The loop filtering as a second process of the motion picture coding is performed by the second processor 120. Image data is transmitted through the data input terminal 103 to the multiplier 170 existing on the first pipe-lined stage of the second processor 120. Filter coefficient data is also transmitted through the data input terminal 104 to the multiplier 170. The multiplier 170 executes the multiplication of the image data and the filter coefficient data. The multiplier 170 transmits the result of the multiplication of the image data and the filter coefficient data to the accumulator 180 which exists on the second pipe-lined stage of the second processor 120. The accumulator 180 accumulates the result of the multiplication of the image data and the filter coefficient data on the previous result of the accumulation executed by itself. The accumulator 180 transmits the result of the accumulation to the selector 190. The selector 190 selects the result of the accumulation executed by the accumulator 180 and transmits it to the arithmetic result output terminal 106 according to the control signals supplied through the control signal input terminal 109. Namely, the result of the accumulation is outputted through the arithmetic result output terminal 106 as an arithmetic result of the process of the loop filtering, thereby permitting digital filtering to be realized. Therefore, the accomplishment of the loop filtering process requires the second processor 120, for example, the multiplier 170 and the accumulator 140.

The inter-frame difference as a third process of the motion picture coding is performed by the first processor 110. Image data are inputted through the data input terminals 101 and 102 to the adder 130 existing on the first pipe-lined stage of the first processor 110. The adder 130 executes the subtraction between the image data, both of which are transmitted through the data input terminals 101 and 102. The adder 130 transmits the result of the subtraction between the image data to the selector 160. The selector 160 selects the result of the subtraction executed by the adder 130 and transmits it to the arithmetic result output terminal 105. Namely, the result of the subtraction is outputted through the arithmetic result output terminal 105 as an arithmetic result of the process of the inter-frame difference. Therefore, the accomplishment of the inter-frame difference process requires the first processor 110, for example, the adder 130.

The discrete cosine transform (DCT) as a fourth process of the motion picture coding is performed by the second processor 120. Image data is transmitted through the data input terminal 103 to the multiplier 170 which exists on the first pipe-lined stage of the second processor 120. Discrete cosine transform coefficient (DCT coefficient) data is also transmitted through the data input terminal 104 to the multiplier 170. The multiplier 170 executes the multiplication of the image data and the discrete cosine transform coefficient (DCT coefficient) data. The multiplier 170 transmits the result of the multiplication of the image data and the discrete cosine transform coefficient (DCT coefficient) data to the accumulator 180 which exists on the second pipe-lined stage of the second processor 120. The accumulator 180 accumulates the result of the multiplication of the image data and the discrete cosine transform coefficient (DCT coefficient) data on the previous result of the accumulation executed by itself. The accumulator 180 transmits the result of the accumulation to the selector 190. The selector 190 selects the result of the accumulation executed by the accumulator 180 and transmits it to the arithmetic result output terminal 106 according to the control signals supplied through the control signal input terminal 109. Namely, the result of the accumulation is outputted through the arithmetic result output terminal 106 as an arithmetic result of the process of the discrete cosine transform. Therefore, the accomplishment of the discrete cosine transform process requires the second processor 120, for example, the multiplier 170 and the accumulator 180.

The quantization as a fifth process of the motion picture coding is performed by the second processor 120. The arithmetic result of the discrete cosine transform (DCT) process is inputted through the data input terminal 103 to the multiplier 170 existing on the first pipe-lined stage of the second processor 120. The reciprocal of the quantization coefficient is inputted through the data input terminal 104 to the multiplier 170. The multiplier 170 executes the multiplication between the arithmetic result of the discrete cosine transform (DCT) and the reciprocal of the quantization coefficient, both of which are transmitted through the data input terminals 103 and 104 respectively. The multiplier 170 transmits the result of the multiplication between the arithmetic result of the discrete cosine transform (DCT) and the reciprocal of the quantization coefficient to the selector 190. The selector 190 selects the result of the multiplication executed by the multiplier 170 and transmits it to the arithmetic result output terminal 106 according to the control signals supplied through the control signal input terminal 109. Namely, the result of the multiplication is outputted through the arithmetic result output terminal 106 as an arithmetic result of the process of the quantization. Therefore, the accomplishment of the quantization process requires the second processor 120, for example, the multiplier 170.

The inverse quantization as a sixth process of the motion picture coding is performed by the second processor 120. The arithmetic result of the quantization process is transmitted through the data input terminal 103 to the multiplier 170 which exists on the first pipe-lined stage of the second processor 120. Quantization coefficient data is transmitted through the data input terminal 104 to the multiplier 170. The multiplier 170 executes the multiplication of the arithmetic result of the quantization and the quantization coefficient data. The multiplier 170 transmits the result of the multiplication of the arithmetic result of the quantization and the quantization coefficient data to the accumulator 180 which exists on the second pipe-lined stage of the second processor 120. The accumulator 180 performs the addition of the result of the multiplication provided by the multiplier 170 and a predetermined constant value stored in the accumulator 180. The accumulator 180 transmits the result of the addition to the selector 190. The selector 190 selects the result of the addition executed by the accumulator 140 and transmits it to the arithmetic result output terminal 106 according to the control signals supplied through the control signal input terminal 109. Namely, the result of the addition is outputted through the arithmetic result output terminal 106 as an arithmetic result of the process of the inverse quantization. Therefore, the accomplishment of the inverse quantization process requires the second processor 120, for example, the multiplier 170 and the accumulator 180 executing the addition. The inverse discrete cosine transform (inverse DCT) as a seventh process of the motion picture coding is performed by the second processor 120. The arithmetic result of the inverse quantization process is transmitted through the data input terminal 103 to the multiplier 170 which exists on the first pipe-lined stage of the second processor 120. Inverse discrete cosine transform (inverse DCT) coefficient data is transmitted through the data input terminal 104 to the multiplier 170. The multiplier 170 executes the multiplication of the arithmetic result of the inverse quantization and the inverse discrete cosine transform (inverse DCT) coefficient data. The multiplier 170 transmits the result of the multiplication of the arithmetic result of the inverse quantization and the inverse discrete cosine transform (inverse DCT) coefficient data to the accumulator 180 which exists on the second pipe-lined stage of the second processor 120. The accumulator 180 accumulates the result of the multiplication of the arithmetic result of the inverse quantization and the inverse discrete cosine transform (inverse DCT) coefficient data on the previous result of the accumulation executed by itself. The accumulator 180 transmits the result of the accumulation to the selector 190. The selector 190 selects the result of the accumulation executed by the accumulator 180 and transmits it to the arithmetic result output terminal 106 according to the control signals supplied through the control signal input terminal 109. Namely, the result of the accumulation is outputted through the arithmetic result output terminal 106 as an arithmetic result of the process of the inverse discrete cosine transform (inverse DCT). Therefore, the accomplishment of the inverse discrete cosine transform (inverse DCT) process requires the second processor 120, for example, the multiplier 170 and the accumulator 180.

The inter-frame addition as a final process of the motion picture coding is performed by the first processor 110. The arithmetic result of the inverse discrete cosine transform (inverse DCT) process is inputted through the data input terminal 101 to the adder 130 existing on the first pipe-lined stage of the first processor 110. Image data is inputted through the data input terminal 102 to the adder 130. The adder 130 executes the addition between the image data and the arithmetic result of the inverse discrete cosine transform (inverse DCT), both of which are transmitted through the data input terminals 102 and 101 respectively. The adder 130 transmits the result of the addition between the image data and the arithmetic result of the inverse discrete cosine transform (inverse DCT) to the selector 160. The selector 160 selects the result of the addition executed by the adder 130 and transmits it to the arithmetic result output terminal 105 according to the control signals supplied through the control signal input terminal 108. Namely, the result of the addition is outputted through the arithmetic result output terminal 105 as an arithmetic result of the process of the inter-frame addition. Therefore, the accomplishment of the inter-frame addition process requires the first processor 110, for example, the adder 130.

FIG. 6 is a timing chart which indicates the sequence of the above motion picture coding processes and the number of steps required to accomplish each of the above processes for first, second and third macro blocks. The first, second and third macro blocks are in turn processed. With respect to the first macro block, illustrated are a part of the above coding processes, for example, the discrete cosine transform (DCT), the quantization, the inverse quantization, the inverse discrete cosine transform (inverse DCT) and the inter-frame addition. With respect to the second macro block, illustrated are all of the above coding processes. With respect to the third macro block, illustrated are a part of the above coding processes, for example, the motion vector detection, the loop filtering and the inter-frame difference. A step means a performance time of one pipe-lined stage of the motion picture coder.

The number of steps of each motion picture coding process for a single macro block will be described. The motion vector detection as a first motion picture coding process requires 2880 steps. The loop filtering as a second motion picture coding process requires 3114 steps. The inter-frame difference as a third motion picture coding process requires 384 steps. The discrete cosine transform (DCT) as a fourth motion picture coding process requires 6144 steps. The quantization as a fifth motion picture coding process requires 384 steps. The inverse quentization as a sixth motion picture coding process requires 786 steps. The inverse discrete cosine transform (inverse DCT) as a seventh motion picture coding process requires 6144 steps. The inter-frame addition as a final motion picture coding process requires 384 steps. The inverse quentization as a sixth motion picture coding process requires 786 steps. From the above description, it is understood that the number of the steps required for each of the above motion picture coding processes are the same as the prior art. However, processing time required for each macro block is shorter than that of the prior art, which will be apparent from the following descriptions.

In the prior art, the above eight processes of the motion picture coding are sequentially and continuously performed by a single processor and thus the conventional motion picture coder. In contract, in the present invention, the first processor 110 including the adder 130 executes the motion vector detection, the inter-frame difference and the inter-frame addition only. The second processor 120 including the multiplier 170 executes other coding processes, and thus the loop filtering, the discrete cosine transform (DCT), the quantization, the inverse quantization, the inverse discrete cosine transform (inverse DCT). Further, the first and second processors 110 and 120 concurrently execute the above different motion picture coding processes for but different macro blocks such as the first and second macro blocks respectively.

When the first processor 110 of the motion picture coder performs the motion vector detection for the second macro block, the second processor 120 of the motion picture coder performs the discrete cosine transform (DCT) for the first macro block. Namely, the motion vector detection process for the second macro block and the discrete cosine transform (DCT) for the first macro block are concurrently performed by the first and second processors 110 and 120 respectively. Similarly, when the first processor 110 performs the inter-frame addition for the first macro block, the second processor 120 performs the loop filtering for the second macro block. Thus, the inter-frame addition for the first macro block and the loop filtering for the second macro block are concurrently performed by the first and second processors 110 and 120 respectively. The above architecture of the motion picture coder provided by the invention so arranges that the first processor 110 involving the adder 130 is completely separated from, and thus in parallel to the second processor 120 involving the multiplier 170. This permits parallel operations by the first and second processors 110 and 120.

The procedures of the motion picture coding processes will be described in detail with reference to FIG. 6.

When the first processor 110 starts to execute the motion vector detection for the second macro block, the second processor 120 starts to execute the discrete cosine transform (DCT) for the first macro block. The parallel operations for the first and second macro blocks are realized by the first and second processors 110 and 120. Since the number of step of the motion vector detection is less than that of the discrete cosine transform (DCT), the first processor 110 finishes the motion vector detection prior to finishing the discrete cosine transform (DCT). After that, the first processor 110 keeps executing no process until the second processor 120 finishes the inverse discrete cosine transform (inverse DCT) for the first macro block. In contrast, the second processor 120 continuously executes in turn the discrete cosine transform (DCT), the quantization, the inverse quantization and the inverse discrete cosine transform (inverse DCT). After finishing the above continuous processes for the first macro block by the second processor 120, the first and second processors 110 and 120 successively start the inter-frame addition for the first macro block and the loop filtering for the second macro block respectively. Since the number of steps of the inter-frame addition is less than that of the loop filtering, the first processor 110 finishes the inter-frame addition process prior to finishing the loop filtering process. After that, the first processor 110 keeps executing no process until the second processor 120 finishes the loop filtering process. When the loop filtering is finished, the first processor 110 starts to execute the inter-frame difference for the second macro block. After finishing the inter-frame difference, the above procedures of the motion picture coding processes are successively repeated until the motion picture coder completes the motion picture coding processes for all macro blocks.

Substantially, the processing time for a single macro block is defined by a time between starting the motion vector detection for a macro block and starting the motion vector detection for a next macro block. Thus, the novel motion picture coder provided by the present invention allows the number of the processing steps required for a single macro block to be considerably reduced up to 16938 steps. Then, the processing speed of the motion picture coding is considerably improved up to approximately 20% as compared with the prior art.

Whereas modifications of the present invention will no doubt be apparent to a person of ordinary skill in the art, it is to be understood that the embodiments shown and described by way of illustration are by no means intended to be considered in a limiting sense. Accordingly, it is to be intended by claims to cover all modifications of the invention which fall within the sprit and scope of the invention.

What is claimed is :

1. A motion picture coder having multi-pipeline stages for coding a plurality of macro blocks of motion picture data based upon a predetermined standardizing system, said coder comprising:
 a first pipe-lined processor for executing a motion vector detection process for a second macro block, an inter-frame addition process for a first macro block and an inter-frame difference process for said second macro block; and
 a second pipe-lined processor for executing a discrete cosine transform process for said first macro block, a quantization process for said first macro block, an inverse quantization process for said first macro block, an inverse discrete cosine transform process for said first macro block and a loop filtering process for said first macro block, said second pipe-lined processor being separated from said first pipe-lined processor so as to perform a parallel operation of said first and second pipe-lined processors.

2. The motion picture coder as claimed in claim 1, wherein said first and second pipe-lined processors concurrently execute said motion vector detection process and said discrete cosine transform process respectively.

3. The motion picture coder as claimed in claim 1, wherein said first and second pipe-lined processors concurrently execute said inter-frame addition process and said loop filtering process respectively.

4. The motion picture coder as claimed in claim 1, wherein said first pipe-lined processor comprises first, second and third pipe-lined stages, said first pipe-lined stage including an adder, said second pipe-lined stage including an accumulator and said third pipe-lined stage including a minimum value detector.

5. The motion picture coder as claimed in claim 1, wherein said second pipe-lined processor comprises first and second pipe-lined stages, said first pipe-lined stage including a multiplier and said second pipe-lined stage including an accumulator.

* * * * *